(12) United States Patent
Wang et al.

(10) Patent No.: US 9,606,819 B2
(45) Date of Patent: Mar. 28, 2017

(54) WIRELESS NETWORK, IMPLEMENTATION METHOD THEREOF, AND TERMINAL

(71) Applicant: Huawei Technologies Co., Ltd., Shenzhen, Guangdong (CN)

(72) Inventors: Bingfu Wang, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 14/196,966

(22) Filed: Mar. 4, 2014

(65) Prior Publication Data

US 2014/0189692 A1 Jul. 3, 2014

Related U.S. Application Data

(63) Continuation of application No. PCT/CN2012/081149, filed on Sep. 7, 2012.

(30) Foreign Application Priority Data

Sep. 7, 2011 (CN) .......................... 2011 1 0263978

(51) Int. Cl.
*G06F 9/455* (2006.01)
*H04W 4/00* (2009.01)
(Continued)

(52) U.S. Cl.
CPC ........ *G06F 9/45533* (2013.01); *G06F 9/5072* (2013.01); *H04L 67/04* (2013.01);
(Continued)

(58) Field of Classification Search
None
See application file for complete search history.

(56) References Cited

U.S. PATENT DOCUMENTS

2002/0091802 A1\* 7/2002 Paul .................... H04L 12/5695
   709/220
2007/0124474 A1\* 5/2007 Margulis ....................... 709/226
(Continued)

FOREIGN PATENT DOCUMENTS

CN       101557551 A     10/2009
CN       101754407 A      6/2010
CN       102103778 A      6/2011

OTHER PUBLICATIONS

Wenwu Zhu, et al., "Multimedia Cloud Computing, An emerging technology for providing multimedia services and applications", IEEE Signal Processing Magazine, May 2011, p. 59-69.
(Continued)

*Primary Examiner* — Craig Dorais

(57) ABSTRACT

The present invention provides a wireless network, an implementation method thereof, and a terminal. The wireless network includes a terminal, a mobile communication network, and a network cloud, where the terminal is connected to the network cloud through the mobile communication network; a virtual machine corresponding to the terminal is provided in the network cloud; a tenant corresponding to the virtual machine is provided on the terminal; the virtual machine is configured to run an application and/or process a file as a proxy of the terminal, and upon reception of an operation command sent by the tenant, transmit display screen image data that is of the application and/or file and corresponds to the operation command to the tenant through a wireless air interface.

19 Claims, 5 Drawing Sheets

(51) Int. Cl.
*H04L 29/08* (2006.01)
*H04W 8/22* (2009.01)
*G06F 9/50* (2006.01)

(52) U.S. Cl.
CPC .......... *H04L 67/08* (2013.01); *H04L 67/1002* (2013.01); *H04W 4/00* (2013.01); *H04W 4/003* (2013.01); *H04W 8/22* (2013.01); *G06F 2209/509* (2013.01); *H04L 67/148* (2013.01)

(56) References Cited

U.S. PATENT DOCUMENTS

2007/0283348 A1* 12/2007 White ............................ 718/1
2011/0153868 A1    6/2011 Castleberry et al.

OTHER PUBLICATIONS

Yan Lu, et al., "Virtualized Screen: A Third Element for Cloud-Mobile Convergence", IEEE, vol. 18, No. 18, Feb. 1, 2011, p. 4-11.
Pieter Simoens, et al., "Remote Display Solutions for Mobile Cloud Computing", Computer Practices, Aug. 1, 2011, p. 46-53.
L. Deboosere, et al., "Grid design for mobile thin client computing", Future Generation Computer Systems, Dec. 14, 2010, p. 681-693.

* cited by examiner

WIRELESS NETWORK, IMPLEMENTATION METHOD THEREOF, AND TERMINAL

CROSS-REFERENCE TO RELATED APPLICATIONS

This application is a continuation of International Application No. PCT/CN2012/081149, filed on Sep. 7, 2012, which claims priority to Chinese Patent Application No. 201110263978.3, filed on Sep. 7, 2011 both of which are hereby incorporated by reference in their entireties.

TECHNICAL FIELD

The present invention relates to the field of communication device technologies, and in particular, to a wireless network, an implementation method thereof, and a terminal.

BACKGROUND

A mobile Internet based on a conventional mobile communication system is shown in FIG. 1. A mobile communication network includes a radio access network (RAN, Radio Access Network) and a mobile core network (CN, Core Network), where the RAN is responsible for providing wireless access for a mobile terminal, and the CN provides a fixed IP (Internet Protocol, Internet Protocol) access point for the mobile terminal by mobility management. In such cases, the mobile terminal accesses an external IP network through the mobile communication network, and accesses an application server (AS, Application Server) through the external IP network, where the mobile terminal normally provides functions of a client (Client), and applications of the application server are provided by an application provider.

A main problem of the mobile Internet based on the conventional mobile communication system lies in that, the mobile communication system is completely channelized. That is, only a channel for IP access is provided, but application-related information, for example, service attributes of an application (quality of service QoS information such as a service type, maximum rate, and average rate), and source encoding information of a service, and the like, cannot be directly obtained from the application server. In such cases, applications are separated from the channel, making it difficult to implement cross-layer optimization between a Transmission Control Protocol (TCP, Transmission Control Protocol) layer as well as a User Datagram Protocol (UDP, User Datagram Protocol) layer and an access layer, and no effective QoS guarantee can be provided for the service.

From a view point of a mobile terminal user, a mobile Internet application requires mass storage services and computing services in addition to the required access service of the channel, where the storage service refers to storing a user's data, including unformatted data, such as images and videos, and formatted data, such as data files and emails; and the computing service refers to provision of office-like software, such as Microsoft Office software, software such as CAD (Computer Aided Design, computer aided design), CAM (Computer Aided Manufacturing, computer aided manufacturing), and CAE (Computer Aided Engineering, computer aided engineering), MATLAB (Matrix Laboratory, matrix laboratory) for scientific computing, and network games. At present, a user-specific storage service and a computing service are mainly provided by the mobile terminal itself; however, such services are obviously limited to the limited computing and storage capabilities of the mobile terminal, for example, a mobile phone. When data is large, such as a streaming high-definition video and large data files, although the user may use only a small part thereof, all or a part of the data files still need to be transmitted.

The prior art has the technical problem that computing and storage capabilities of a mobile terminal are limited and that transmission bandwidth for storing a large data file cannot be effectively used, and an early solution is required.

SUMMARY

With respect to the technical problem that computing and storage capabilities of a terminal are limited and that transmission bandwidth for storing a large data file cannot be effectively used, embodiments of the present invention provide a wireless network, an implementation method thereof, and a terminal.

Embodiments of the present invention provide a wireless network and an implementation method thereof, where the wireless network is capable of solving the problem that the computing and storage capabilities of a terminal are limited, and is capable of effectively using the transmission bandwidth.

Embodiments of the present invention further provide a terminal, where the terminal does not require a large local storage space and a high CPU processing capability.

According to the foregoing objectives, the technical solutions of the embodiments of the present invention are realized as follows:

A wireless network includes a terminal, a mobile communication network, and a network cloud, where the terminal is connected to the network cloud through the mobile communication network;

a virtual machine corresponding to the terminal is provided in the network cloud, and a tenant corresponding to the virtual machine is provided on the terminal; and the virtual machine is configured to run an application and/or process a file as a proxy of the terminal, and upon reception of an operation command sent by the tenant, transmit display screen image data that is of the application and/or file and corresponds to the operation command to the tenant through a wireless air interface.

A terminal includes an input device, a tenant, and a display screen, where:

the tenant corresponds to a virtual machine provided in a network cloud to which the terminal is connected through a mobile communication network;

the input device is configured to receive an operation command input by a user;

the tenant is configured to upload the operation command to the virtual machine, and receive display screen image data, which is transmitted by the virtual machine through a wireless air interface, of an application that is run and/or a file that is processed by the virtual machine acting as a proxy of the terminal according to the operation command; and the display screen is configured to display the display screen image data received by the tenant.

An implementation method of a wireless network is provided, where the wireless network includes a terminal, a mobile communication network, and a network cloud, and the terminal is connected to the network cloud through the mobile communication network, and the method includes:

providing, in the network cloud, a virtual machine corresponding to the terminal, and providing, on the terminal, a tenant corresponding to the virtual machine; and running an application and/or processing a file by the virtual machine as a proxy of the terminal, and upon reception of an operation command sent by the tenant, transmitting display screen image data that is of the application and/or file and corresponds to the operation command to the tenant through a wireless air interface.

According to the foregoing solutions, in the method and apparatus provided by the embodiments of the present invention, a virtual machine acting as a proxy of a terminal is provided in a network cloud to implement functions such as computing, storage, and processing, and the terminal receives and displays, by using a tenant corresponding to the virtual machine, a result of a function implemented by the virtual machine acting as a proxy of the terminal. Therefore, the terminal does not need to have a large local storage space and a high CPU processing capability, and may with the help of the virtual machine in the network cloud, implement functions that require large bandwidth for implementation, such as performing an operation on a streaming media file, and processing and transmitting a large file.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
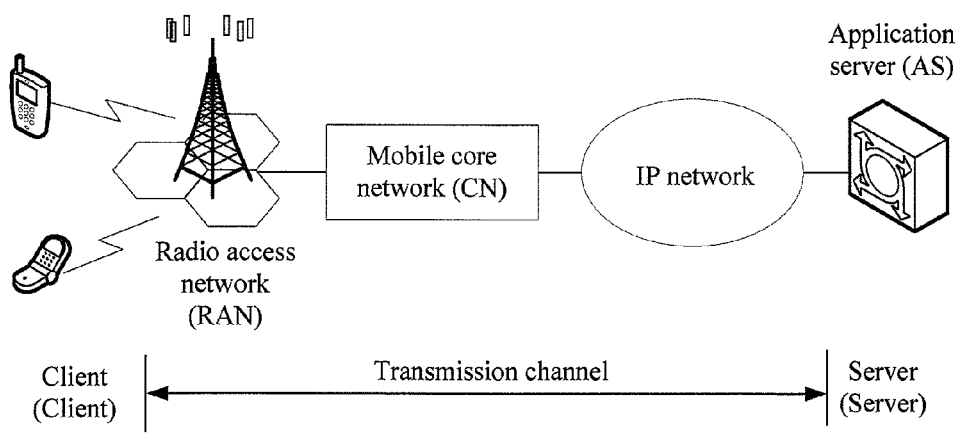
FIG. 1 is a schematic diagram of an architecture of a mobile communication network according to the prior art.
Figure 2:
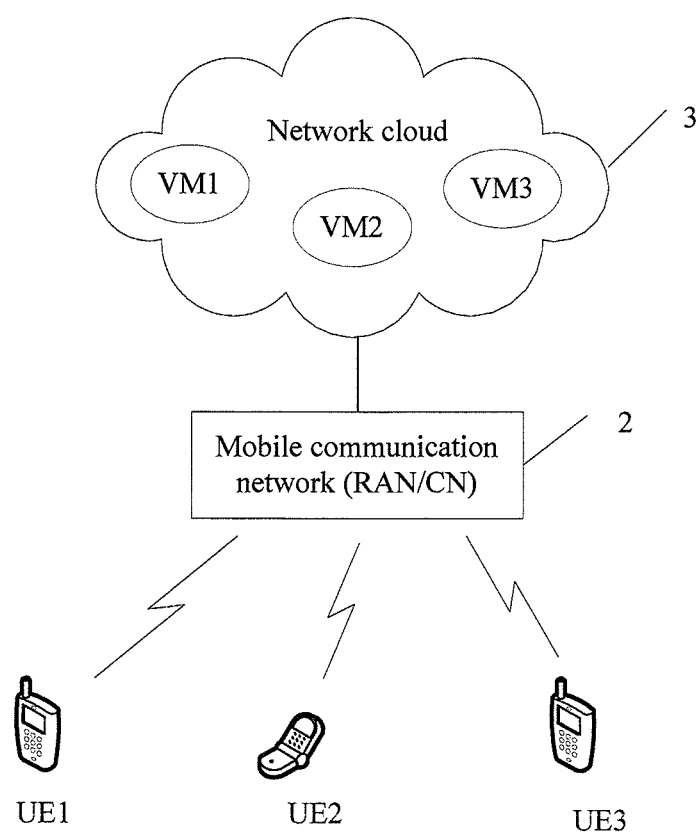
FIG. 2 is a schematic composition diagram of a wireless network according to Embodiment 1 of the present invention.

A wireless network according to embodiments of the present invention is a wireless network architecture based on a network cloud. FIG. 2 shows composition of a wireless network according to the present invention.

The wireless network according to the present invention includes:

a terminal (shown as UE1, UE2, and UE3 in the figure), a mobile communication network 2, and a network cloud 3, where the terminal is connected to the network cloud 3 through the mobile communication network 2;

a virtual machine (shown as VM1, VM2, and VM3 in the figure) corresponding to the terminal is provided in the network cloud 3, and a tenant (not shown in the figure) corresponding to the virtual machine is provided on the terminal; and the virtual machines VM1, VM2, and VM3 are configured to run an application and/or process a file as a proxy of the terminals UE1, UE2, and UE3, and upon reception of an operation command sent by the tenant of each terminal, transmit display screen image data that is of the application and/or file and corresponds to the operation command to the tenant through a wireless air interface.

It should be noted that the network cloud includes an infrastructure for information services inclusive of a network, computing, and storage, and includes software such as a relevant operating system, an application platform, Web services and applications, and has strong computing and processing capabilities. In the network cloud, software and hardware of a system are virtualized and encapsulated into services that may be accessed and used by a user through a network. A user of a cloud service sees only the service itself, but does not care about specific implementation of the relevant infrastructure, including an address and location, resource allocation and management, and software and hardware platform. The hardware infrastructure of the network cloud is typically a data center (Data Center), or multiple interconnected data centers, or a server cluster including computers distributed at different geographical locations. The software infrastructure of the network cloud is responsible for virtualization of the hardware infrastructure, resource management and monitoring, security, and charging management, thereby encapsulating the software infrastructure and hardware infrastructure into services to provide to users.

In an actual network, multiple terminals may be connected to a network cloud through a mobile communication network. Each terminal has a virtual machine (VM, Virtual Machine) in the network cloud, where the virtual machine is equivalent to a virtual terminal. The virtual machine acts as a proxy of the terminal to run an application and/or process a file, including running a local application of the terminal or a mobile broadband (MBB, Mobile Broadband) application, or opening and/or operating streaming media video data, or transmitting and/or processing file data. Specifically, all local and mobile broadband applications that are previously run on the terminal are run on the virtual machine of the network cloud corresponding to the terminal. In addition, all data (media such as videos and images and data files of various applications) is stored in the virtual machine of the network cloud.

The operation command sent by the tenant on the terminal to the virtual machine includes an operation command input by the user through a keyboard, a mouse, or a touchscreen of the terminal. In addition, voice or audio data may also be transmitted between the terminal and the virtual machine provided in the network cloud.

As described above, only display screen image data, and mouse or keyboard I/O (Input or Output, input or output) data, and the like, are transmitted between the terminal and the virtual machine through the wireless air interface and a wireless cellular network.

Figure 3:
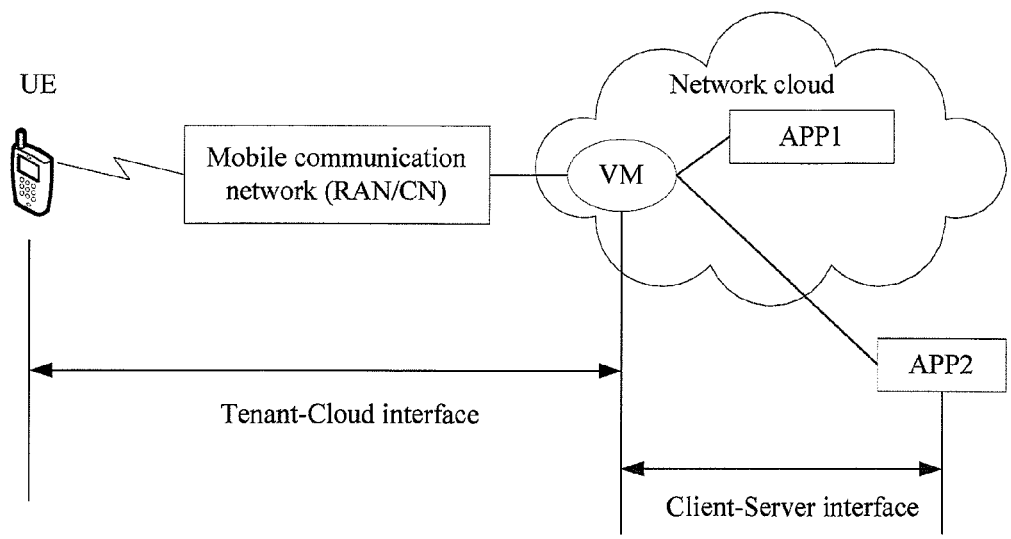
FIG. 3 is a schematic composition diagram of a wireless network according to Embodiment 2 of the present invention.

Refer to FIG. 3, which shows interface relationships between main nodes in the wireless network structure according to the present invention.

The interface between the terminal and the corresponding VM in the network cloud is an interface (Tenant-Cloud interface) between the tenant and the network cloud, which is mainly used to transmit display screen image data to the tenant and transmit I/O data such as mouse/keyboard data to the virtual machine. If an MBB application is run on the VM, an interface between the VM and a server that provides the MBB application is a typical interface between a client and a server (Client-Server), where the server providing the MBB application may be located outside the network cloud, as shown by APP2 in the figure. Of course, the server providing the MBB application may also be located within the network cloud and run on a virtual server provided by the network cloud, as shown by APP1 in the figure.

When the embodiment of the present invention is used, a change rate of display screen images of a streaming media video and most applications is small; therefore, a compression rate of a display screen image is high. Moreover, as limited by the volume of a terminal, normally a display screen of the terminal has a small size (typically smaller than 4.5 inches) and low resolution (typically smaller than 1024× 768), and a data rate of other data such as input data of a keyboard, a touchscreen, and the like, is very low; therefore, an average rate of data transmitted between a UE and a VM through a wireless air interface and a wireless cellular network is low. When the user inputs an operation command by using the keyboard or the touchscreen to open or operate a high-definition streaming media video or a large data file such as a PDF or Word file, the transmission and operation of the file are performed in the virtual machine of the network cloud. The virtual machine transmits only display screen image data corresponding to a part that the user is operating or is interested in, to the tenant on the terminal, which avoids transmitting all or a part of data files through the wireless air interface, thereby implementing transmission fully according to requirements and saving service traffic of the mobile network.

In addition to the display screen image data, input or output data, and voice or audio data mentioned in this embodiment, the terminal is further configured to upload, to the virtual machine, any one of the following real-time data: image or video data taken by using a camera device, global positioning system GPS location information data, data of a peripheral device obtained through a wired interface, and data of a peripheral device obtained through a wireless interface. The file data is transmitted between the virtual machine and the tenant of the terminal.

Specifically, in an uplink direction (that is, a direction in which the terminal transmits data to the network cloud), the terminal may also upload the following data to the network cloud:

data obtained by an input device of the terminal, such as by a sensor, such as an image or video taken by a UE camera, GPS location information, and the like; and data obtained from another device through a wired interface, such as USE, or through a short-distance wireless interface, such as Bluetooth/WiFi. In a downlink direction, in addition to the display screen image data and voice or audio data transmitted from the network cloud to the UE, the network cloud may also transmit the foregoing data of the UE directly to the tenant of the UE through the virtual machine for the UE to store locally. In other words, the UE may also have a local storage capability, and some locally obtained data is merely stored locally and is not uploaded to the network cloud, while a copy of data generated or obtained in the network cloud may also be downloaded to the UE for the UE to store locally.

Meanwhile, because all data (media, such as videos and images, data files of various applications, and the like) of the UE is stored in the virtual machine of the network cloud, and when data needs to be exchanged between different UEs, data exchange for a data file is directly performed between virtual machines of the network cloud corresponding to different UEs, and data transmission through the wireless air interface is not required. Therefore, for an application where a large amount of data needs to be exchanged among various terminals, the present invention may effectively save wireless air interface resources.

It should be noted that: in the embodiment of the present invention, the tenant uploads the operation command to the virtual machine according to a fixed quality of service attribute; or the virtual machine transmits display screen image data that is of an application and/or a file and corresponds to the operation command to the tenant according to a fixed quality of service attribute; or the tenant uploads real-time data to the virtual machine according to a fixed quality of service attribute; or the virtual machine exchanges file data with the tenant according to a fixed quality of service attribute.

Specifically, in the data transmitted between the tenant provided on the UE and the virtual machine provided in the network cloud, display screen image data transmitted in the downlink direction from the virtual machine of the network cloud to the tenant of the UE occupies most bandwidth. In addition, in a particular application of video real-time broadcast and video call by using a camera of the terminal, video data transmitted in the uplink direction from the tenant of the UE to the virtual machine of the network cloud also occupies large bandwidth. Other I/O data, including input data of a keyboard or touchscreen transmitted from the tenant of the UE to the virtual machine of the network cloud, and voice or video data transmitted between the tenant of the UE and the virtual machine of the network cloud, occupies small bandwidth, and a requirement on a delay is similar to that of the display screen image data. Remaining data of other types is non-real-time data.

A size and resolution of a terminal display screen are fixed; therefore, a transmission rate of the display screen image data transmitted in the downlink direction from the virtual machine of the network cloud to the tenant of the UE is basically stable, and requirements on a transmission delay are the same, that is, within a permissible range of delays for a human-machine interface, which normally does not exceed 250 ms. Other I/O data, including input data of the keyboard or touchscreen and voice or audio data transmitted from the tenant of the UE to the virtual machine of the network cloud, also has definite known requirements on the transmission rate and delay. In a particular application of video real-time broadcast or video call by using a camera of the terminal, video data transmitted in the uplink direction from the tenant of the UE to the virtual machine of the network cloud also has definite requirements on the transmission rate (which is determined according to the resolution, number of frames per second, compression algorithm, and the like) and transmission delay. The remaining data (file transmission) of other types is non-real-time data, and a QoS attribute is best-effort (Best-effort) type. Moreover, the UE and the network cloud are capable of differentiating the four types of data. In the embodiment of the present invention, regardless of the type of an application that is actually run by the UE, a QoS attribute of data transmitted between the tenant of the UE and the virtual machine of the network cloud is basically fixed, and unlike the prior art, it is unnecessary to obtain QoS attribute information for different applications.

In the present invention, in order to obtain a QoS attribute for transmission between the tenant of the UE and the virtual machine of the network cloud, the terminal needs to report other configuration information to the mobile communication network, and the mobile communication network, according to the configuration information, generates a quality of service attribute for performing data exchange between the tenant and the virtual machine.

Specifically, when the UE accesses a wireless communication network, the UE needs to provide its basic configuration information, such as the display screen size, display resolution, camera resolution, number of frames per second, and compression algorithm, for an RAN and a CN in the mobile communication network by terminal capability reporting. The RAN and CN use the configuration information to generate QoS requirement information for data transmission between the UE and the network cloud, and use the information to optimize a wireless air interface and a wireless network by using a QoS technology of a wireless cellular network, optimize utilization of wireless resources, and provide the required QoS guarantee for the UE as much as possible. Meanwhile, the wireless network may also, according to a load condition of the wireless air interface, properly reduce the size and resolution of the display screen image when the wireless resources are insufficient, thereby ensuring the delay requirements for real-time display screen updating.

It should be noted that the tenant, provided by the present invention and corresponding to the virtual machine, may be provided on different terminals.

Specifically, because local and mobile broadband applications that are actually run on the UE previously are run on the virtual machine of the network cloud corresponding to the UE, and all data of the UE is also stored in the network cloud, the virtual terminal on the user's network cloud side is actually independent of the terminal device, and the user may start the tenant on different mobile phones and terminals such as a mobile phone and a tablet computer, a television, and a computer, and connect to the virtual machine of the UE in the network cloud. Therefore, the tenant can be connected to the virtual machine of the UE in the network cloud only through separate authentication. When the user performs a cross-UE movement, the user may run the tenant on the UE, and start a copy of the tenant on a target UE of the user, where the two tenants are completely synchronized to the user's VM in the network cloud, thereby implementing seamless cross-UE switching. Similarly, this mode may also be used for the user to perform a cross-platform movement.

When the wireless network according to the present invention is implemented, functions of a terminal are implemented by a virtual machine, which acts as a proxy in a network cloud, and only display screen image data or necessary input or output data stream is transmitted between the terminal and the network cloud; therefore, the terminal does not need strong storage and computing capabilities for processing and using large data, and data transmitted between the terminal and the network cloud is comparatively fixed, so that a uniform QoS attribute may be provided, and that transmission bandwidth may be effectively used, which facilitates full use of network bandwidth resources of a mobile operator; moreover, because the uniform QoS attribute is used to transmit data, an interface between the network cloud and the mobile communication network may be standardized, and an SLA agreement (Service-Level Agreement, service level agreement may be entered into between a network cloud service provider and a mobile communication network operator for reasonable interest allocation. Meanwhile, a mobile communication network channel and a network cloud platform may be set up separately, and the network operator and communication operator may provide tenant services for an ISP (Internet Service Provider, Internet service provider) tenant by leasing computing resources and bandwidth resources.

Figure 4:
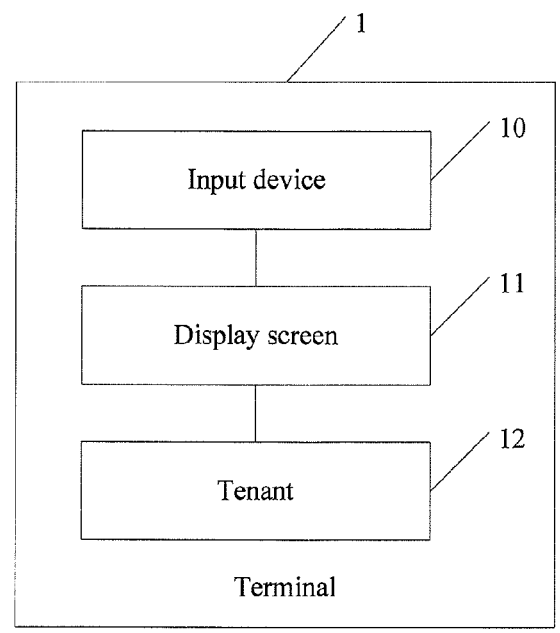
FIG. 4 is a schematic diagram of a terminal according to the present invention.

FIG. 4 is a schematic diagram of a terminal according to the present invention.

A terminal 1 according to an embodiment of the present invention includes an input device 10 and a display screen 11, and the terminal is further provided with a tenant 12 for communicating with a network cloud, where tenant 12 corresponds to a virtual machine that is provided in the network cloud to which the terminal is connected through a mobile communication network; the input device 10 of the terminal is configured to receive an operation command input by a user; the tenant 12 is configured to upload the operation command to the virtual machine in the network cloud, and receive display screen image data, which is transmitted by the virtual machine through a wireless air interface, of an application run and/or a file processed by the virtual machine acting as a proxy of the terminal 1 according to the operation command; and the display screen 11 is configured to display the display screen image data received by the tenant 12.

It should be noted that the input device 10 of the terminal 1 includes a keyboard, a mouse, or a touchscreen.

The terminal according to the embodiment of the present invention may be in the form of a thin UE (Thin UE) or a fat UE (Fat UE), where the thin UE refers to a terminal which does not require a large local storage space and a high CPU processing capability, which may effectively reduce the cost of the UE; and the fat UE refers to a standard UE, which may run the tenant 12 as described above or run applications in a common manner, that is, run all applications locally.

Figure 5:
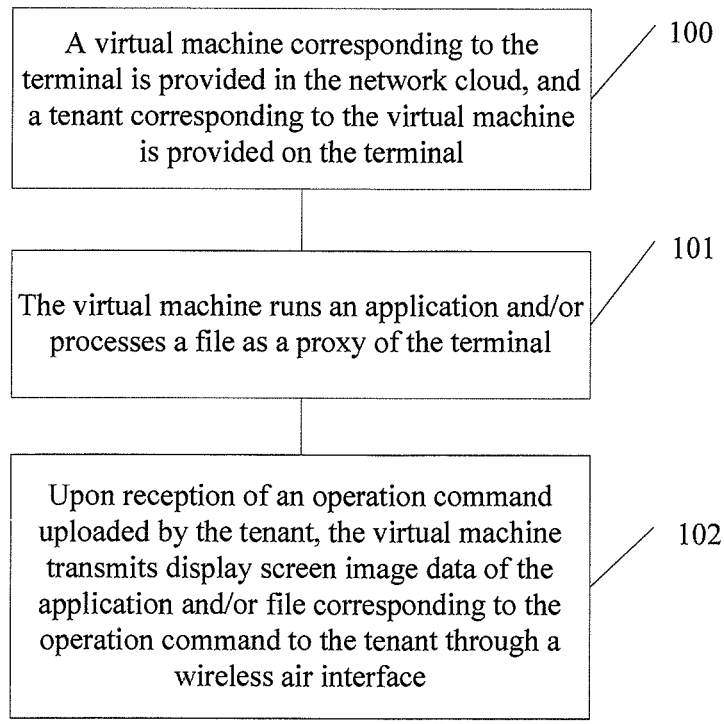
FIG. 5 is a schematic flowchart of an implementation method of a wireless network according to Embodiment 1 of the present invention.

FIG. 5 is a schematic flowchart of an implementation method of a wireless network according to Embodiment 1 of the present invention.

The implementation method of a wireless network according to the present invention is used for the wireless network according to the foregoing embodiment, where the wireless network includes a terminal, a mobile communication network, and a network cloud, and the terminal is connected to the network cloud through the mobile communication network; the implementation method of the wireless network includes:

Step 100: A virtual machine corresponding to the terminal is provided in the network cloud, and a tenant corresponding to the virtual machine is provided on the terminal.

Step 101: The virtual machine runs an application and/or processes a file as a proxy of the terminal.

Step 102: Upon reception of an operation command sent by the tenant, the virtual machine transmits display screen image data that is of the application and/or file and corresponds to the operation command to the tenant through a wireless air interface.

It should be noted that the virtual machine acts as a proxy of the terminal to run an application and/or process a file, including running a local application of the terminal or a mobile broadband application, or opening and/or operating streaming media video data, or transmitting and/or processing file data. The operation command sent by the tenant includes an operation command input by the user through a keyboard, a mouse, or a touchscreen of the terminal.

In addition to the display screen image data, input or output data, and voice or audio data mentioned in this embodiment, the terminal may further upload, to the virtual machine, any one of the following real-time data: voice or audio data, image or video data taken by using a camera device, global positioning system GPS location information data, data of a peripheral device obtained through a wired interface, and data of a peripheral device obtained through a wireless interface. In addition, file data is transmitted between the virtual machine and the tenant of the terminal.

Figure 6:
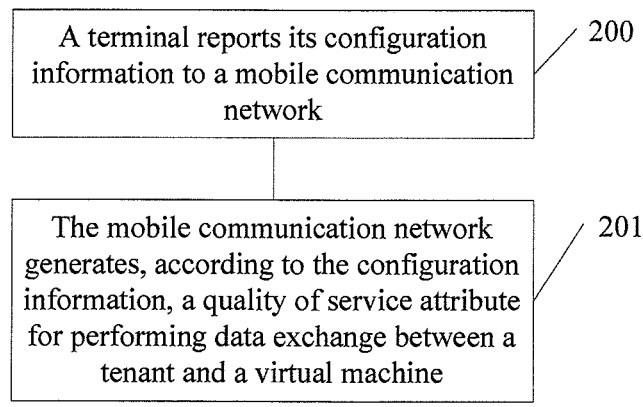
FIG. 6 is a schematic flowchart of an implementation method of a wireless network according to Embodiment 2 of the present invention.

FIG. 6 is a schematic flowchart of an implementation method of a wireless network according to Embodiment 2 of the present invention.

This embodiment mainly describes a process of how to obtain a QoS attribute for performing transmission between a tenant of a UE and a virtual machine of a network cloud, which includes:

Step 200: A terminal reports its configuration information to a mobile communication network.

Specifically, when a UE accesses a wireless communication network, the UE needs to provide an RAN and a CN in the mobile communication network with its basic configuration information such as the display screen size, display resolution, camera resolution, number of frames per second, and compression algorithm by terminal capability reporting.

Step 201: The mobile communication network generates, according to the configuration information, a quality of service attribute for performing data exchange between a tenant and a virtual machine.

Specifically, the RAN and CN use the configuration information to generate QoS requirement information for data transmission between the UE and the network cloud, and use the information to optimize a wireless air interface and a wireless network by using a QoS technology of a wireless cellular network, optimize utilization of wireless resources, and provide the required QoS guarantee for the UE as much as possible.

Therefore, the tenant uploads the operation command to the virtual machine according to a fixed quality of service attribute; or the virtual machine transmits display screen image data that is of an application and/or a file and corresponds to the operation command to the tenant according to a fixed quality of service attribute; or the tenant uploads real-time data to the virtual machine according to a fixed quality of service attribute; or the virtual machine exchanges file data with the tenant according to a fixed quality of service attribute.

Figure 7:
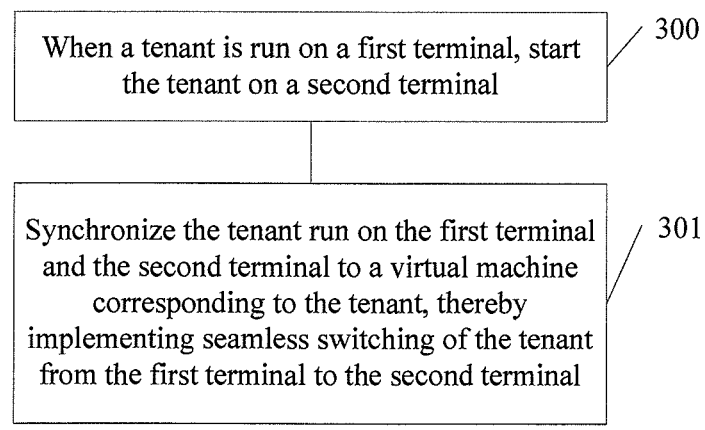
FIG. 7 is a schematic flowchart of an implementation method of a wireless network according to Embodiment 3 of the present invention.

In addition, the tenant, provided by the present invention and corresponding to the virtual machine, may be provided on different terminals. Refer to FIG. 7, which is a schematic flowchart of an implementation method of a wireless network according to Embodiment 3 of the present invention.

This embodiment describes how to switch and use a tenant on different terminals, where the method includes:

Step 300: When the tenant is run on a first terminal, start the tenant on a second terminal.

Step 301: Synchronize the tenant run on the first terminal and the second terminal to a virtual machine corresponding to the tenant, thereby implementing seamless switching of the tenant from the first terminal to the second terminal.

Specifically, because local and mobile broadband applications that are actually run on the UE previously are run on the virtual machine of the network cloud corresponding to the UE, and all data of the UE is also stored in the network cloud, the virtual terminal on the user's network cloud side is actually independent of the terminal device, and the user may start the tenant on different mobile phones and terminals such as a mobile phone and a tablet computer, a television, and a computer, and connect to the virtual machine of the UE in the network cloud. Therefore, the tenant can be connected to the virtual machine of the UE in the network cloud only through separate authentication. When the user performs a cross-UE movement, the user may run the tenant on the UE, and start a copy of the tenant on a target UE of the user, where the two tenants are completely synchronized to the user's VM in the network cloud, thereby implementing seamless cross-UE switching. Similarly, this mode may also be used for the user to perform a cross-platform movement.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, a CD-ROM, a read-only memory (Read-Only Memory, ROM), or a random access memory (Random Access Memory, RAM).

The foregoing descriptions are merely preferred embodiments of the present invention. It should be noted that various improvements and modifications made by persons of ordinary skill in the art within the principle of the present invention shall fall within the protection scope of the present invention.

What is claimed is:

1. A wireless network architecture, comprising:
   a terminal device;
   a mobile communication network;
   a server cluster including distributed computers configured to operate a network cloud, wherein the terminal device is connected to the network cloud through the mobile communication network;
   the network cloud configured to execute a virtual machine corresponding to the terminal device;
   the terminal device configured to execute a tenant application corresponding to the virtual machine;
   wherein the virtual machine is configured to run an application and/or process a file as a proxy of the terminal device, and upon reception of an operation command sent by the tenant application, transmit display screen image data of the application and/or file corresponding to the operation command to the tenant application through a wireless air interface; and
   wherein the virtual machine is configured to perform a data exchange from the terminal device to a different terminal device by exchanging data with a different virtual machine corresponding to the different terminal device.

2. The wireless network architecture according to claim 1, wherein the virtual machine is further configured to:
   run a local application of the terminal device and/or a mobile broadband application; or
   open and/or operate streaming media video data; or
   transmit and/or process file data.

3. The wireless network architecture according to claim 1, wherein the operation command sent by the tenant application comprises an operation command input by a user by using a keyboard, a mouse, or a touchscreen of the terminal device.

4. The wireless network architecture according to claim 1, wherein the terminal device is further configured to upload, to the virtual machine, any one of the following real-time data: voice or audio data, image or video data taken by using a camera device, global positioning system GPS location information data, data of a peripheral device obtained through a wired interface, and data of a peripheral device obtained through a wireless interface.

5. The wireless network architecture according to claim 1, wherein:
the virtual machine is further configured to exchange file data with the tenant application of the terminal device through the wireless air interface.

6. The wireless network architecture according to claim 2, wherein:
the terminal device is further configured to report its configuration information to the mobile communication network; and
the mobile communication network is configured to generate, according to the configuration information, a fixed quality of service attribute for performing data exchange between the tenant application and the virtual machine regardless of the application being executed.

7. The wireless network architecture according to claim 6, wherein:
the tenant application is configured to upload the operation command to the virtual machine according to the fixed quality of service attribute generated by the mobile communication network; or
the virtual machine is configured to transmit the display screen image data that is of the application and/or file and corresponds to the operation command to the tenant application according to the fixed quality of service attribute generated by the mobile communication network; or
the tenant application is configured to upload real-time data to the virtual machine according to the fixed quality of service attribute generated by the mobile communication network; or
the virtual machine is configured to exchange file data with the tenant application according to the fixed quality of service attribute generated by the mobile communication network.

8. The wireless network architecture according to claim 7, wherein the tenant application corresponding to the virtual machine is provided on different terminal devices.

9. The wireless network architecture according to claim 8, wherein the tenant application displays the display screen image data of the application and/or file on a display screen of the terminal device.

10. A terminal device, comprising:
an input device, a tenant application, and a display screen, wherein:
the tenant application corresponds to a virtual machine provided in a network cloud to which the terminal device is connected through a mobile communication network;
the input device is configured to receive an operation command input by a user;
the tenant application is configured to upload the operation command to the virtual machine, and receive display screen image data, which is transmitted by the virtual machine through a wireless air interface, of an application that is run and/or a file that is processed by the virtual machine as a proxy of the terminal device according to the operation command; and
the display screen is configured to display the display screen image data received by the tenant application; and
wherein the tenant application is configured to initiate a data exchange with a different terminal device through another operation command by instructing the virtual machine to perform a data exchange with a different virtual machine corresponding to the different terminal device.

11. The terminal device according to claim 10, wherein the input device comprises a keyboard, a mouse, or a touchscreen.

12. An implementation method of a wireless network comprising a terminal device, a mobile communication network, and a network cloud, wherein the terminal device is connected to the network cloud through the mobile communication network, the method comprising:
providing, in the network cloud, a virtual machine corresponding to the terminal device, and providing, on the terminal device, a tenant application corresponding to the virtual machine;
running an application and/or processing a file by the virtual machine as a proxy of the terminal device, and upon reception of an operation command sent by the tenant application, transmitting display screen image data that is of the application and/or file and corresponds to the operation command to the tenant application through a wireless air interface; and
exchanging data from the terminal device to a different terminal device by exchanging data from the virtual machine to a different virtual machine corresponding to the different terminal device.

13. The implementation method of a wireless network according to claim 12, wherein running an application and/or processing a file by the virtual machine as a proxy of the terminal device comprises:
running a local application of the terminal device and/or a mobile broadband application; or
opening and/or operating streaming media video data; or
transmitting and/or processing file data.

14. The implementation method of a wireless network according to claim 12, wherein the operation command sent by the tenant application comprises an operation command input by a user by using a keyboard, a mouse, or a touchscreen of the terminal device.

15. The implementation method of a wireless network according to claim 12, wherein the method further comprises:
uploading, by the terminal device, to the virtual machine, any one of the following real-time data: voice or audio data, image or video data taken by using a camera device, global positioning system GPS location information data, data of a peripheral device obtained through a wired interface, and data of a peripheral device obtained through a wireless interface.

16. The implementation method of a wireless network according to claim 12, wherein the method further comprises:
exchanging, by the virtual machine, file data with the tenant application of the terminal device through the wireless air interface.

17. The implementation method of a wireless network according to claim 12, wherein the method further comprises:
reporting, by the terminal device, its configuration information to the mobile communication network; and generating, by the mobile communication network according to the configuration information, a quality of service attribute for performing data exchange between the tenant application and the virtual machine regardless of the application being executed.

18. The implementation method of a wireless network according to claim 17, wherein the method further comprises:

uploading, by the tenant application, the operation command to the virtual machine according to the fixed quality of service attribute generated by the mobile network; or transmitting, by the virtual machine, the display screen image data that is of the application and/or file and corresponds to the operation command to the tenant application according to the fixed quality of service attribute generated by the mobile network; or uploading, by the tenant application, real-time data to the virtual machine according to the fixed quality of service attribute generated by the mobile network; or exchanging, by the virtual machine, file data with the tenant application according to the fixed quality of service attribute generated by the mobile network.

19. The implementation method of a wireless network according to claim 18, wherein the method further comprises:

when the tenant application is run on a first terminal device, starting the tenant application on a second terminal device; and synchronizing the tenant application run on the first terminal device and the second terminal device to the virtual machine corresponding to the tenant application, thereby implementing seamless switching of the tenant application from the first terminal device to the second terminal device.

* * * * *